US011918540B2

(12) United States Patent
Smith et al.

(10) Patent No.: US 11,918,540 B2
(45) Date of Patent: Mar. 5, 2024

(54) CAP FOR SPOUT AND MODIFIED SPOUT

(71) Applicant: VONCO PRODUCTS, LLC, Trevor, WI (US)

(72) Inventors: Keith E. Smith, Johnsburg, IL (US); John LaRoi, Libertyville, IL (US); James F. Konicke, Muskego, WI (US); Kyle Vlasak, Fox River Grove, IL (US)

(73) Assignee: VONCO PRODUCTS, LLC, Trevor, WI (US)

( * ) Notice: Subject to any disclaimer, the term of this patent is extended or adjusted under 35 U.S.C. 154(b) by 222 days.

(21) Appl. No.: 17/239,098

(22) Filed: Apr. 23, 2021

(65) Prior Publication Data

US 2021/0330553 A1 Oct. 28, 2021

Related U.S. Application Data

(60) Provisional application No. 63/162,828, filed on Mar. 18, 2021, provisional application No. 63/014,512, filed on Apr. 23, 2020.

(51) Int. Cl.
*A61J 1/14* (2023.01)
*A61J 1/10* (2006.01)

(52) U.S. Cl.
CPC ............... *A61J 1/1481* (2015.05); *A61J 1/10* (2013.01); *A61J 1/1418* (2015.05)

(58) Field of Classification Search
CPC ...... A61J 1/1481; A61J 1/1475; A61J 1/1418; A61J 15/00; A61J 15/0026; A61J 15/0015;

(Continued)

(56) References Cited

U.S. PATENT DOCUMENTS 4,476,987 A 10/1984 Nolan
6,112,452 A 9/2000 Campbell (Continued)

FOREIGN PATENT DOCUMENTS

| | | | |
|---|---|---|---|
| CA | 2964537 A1 * | 10/2018 | .......... A61J 15/0026 |
| EP | 0 994 067 A2 | 4/2000 | |
| WO | WO-2020128056 A1 * | 6/2020 | ............ A61J 1/1412 |

OTHER PUBLICATIONS

U.S. Patent Office, English language version of the International Search Report, Form PCT/ISA/210 for International Application PCT/US2021/039045, dated Oct. 21, 2021 (2 pages).

(Continued)

*Primary Examiner* — Susan S Su
*Assistant Examiner* — Ted Yang
(74) *Attorney, Agent, or Firm* — Pauley Erickson & Swanson

(57) ABSTRACT

An improvement to a standardized design of a body for small-bore connectors for liquids and/or gases in a healthcare application, wherein the body has a spout with a standardized upper portion. The upper portion can have a standardized external thread or can have a different size and shape for the external thread. The body can have a standardized internal flange or another differently sized and shaped internal flange. The body can have an internal void though which the liquids and/or gases flow. At least a portion of the standardized internal flange or another internal flange can be eliminated or removed to reduce a flow restriction caused by the standardized internal flange and thus increase a flow area of the internal void.

6 Claims, 14 Drawing Sheets

The outside dimensions of the cap will allow the use of the same feeding bowls and tracks to load the caps.

(58) Field of Classification Search
CPC .......... A61M 39/10; A61M 2039/1077; A61M 2039/1033
See application file for complete search history.

(56) References Cited

U.S. PATENT DOCUMENTS

| | | | | |
|---|---|---|---|---|
| 10,080,879 | B2 * | 9/2018 | Schuessler | A61M 39/10 |
| 10,307,335 | B2 | 6/2019 | Ingram et al. | |
| 10,857,068 | B2 * | 12/2020 | Davis | A61J 1/2048 |
| 11,166,876 | B2 * | 11/2021 | Davis | B65D 41/0485 |
| 11,401,079 | B2 * | 8/2022 | Cowan | B65D 75/5883 |
| 11,612,693 | B1 * | 3/2023 | Kuracina | A61M 5/3293 604/45 |
| 2005/0039417 | A1 * | 2/2005 | Liedtke | B65B 15/04 53/399 |
| 2006/0219317 | A1 * | 10/2006 | Baldwin | B65B 9/02 141/130 |
| 2010/0213213 | A1 * | 8/2010 | Albers | B65D 41/3409 222/153.05 |
| 2013/0030379 | A1 * | 1/2013 | Ingram | A61J 1/1475 604/218 |
| 2014/0263475 | A1 * | 9/2014 | Totten | B65D 41/3409 222/545 |
| 2014/0291324 | A1 * | 10/2014 | Imai | A61J 1/2096 220/288 |
| 2016/0136048 | A1 * | 5/2016 | Marantis | B67C 11/00 141/331 |
| 2016/0137474 | A1 * | 5/2016 | Marantis | A61J 1/1406 141/331 |
| 2016/0242998 | A1 * | 8/2016 | Brandenburger | A61J 1/10 |
| 2016/0250798 | A1 * | 9/2016 | Diesnis | B65B 3/022 425/524 |
| 2017/0203086 | A1 * | 7/2017 | Davis | A61M 39/10 |
| 2017/0239141 | A1 * | 8/2017 | Davis | A61J 1/1425 |
| 2017/0267425 | A1 | 9/2017 | Stratton | |
| 2018/0050183 | A1 * | 2/2018 | Taylor | A61J 1/2037 |
| 2018/0244446 | A1 * | 8/2018 | Gaillot | B65D 55/0863 |
| 2018/0280234 | A1 * | 10/2018 | Brevik-Andersen | A61K 9/0053 |
| 2019/0282794 | A1 * | 9/2019 | Carlsson | A61M 39/1011 |
| 2019/0314247 | A1 * | 10/2019 | Fleury | A61J 7/0053 |
| 2021/0214130 | A1 * | 7/2021 | Cowan | A61M 39/20 |
| 2022/0047464 | A1 * | 2/2022 | Snow | A61J 1/1475 |
| 2022/0111991 | A1 * | 4/2022 | Wilson | B65D 47/0885 |
| 2023/0031533 | A1 * | 2/2023 | Thompson | B05B 11/026 |

OTHER PUBLICATIONS

U.S. Patent Office, English language version of the Written Opinion of the ISA, Form PCT/ISA/237 for International Application PCT/US2021/039045, dated Oct. 21, 2021 (6 pages).

* cited by examiner

Lab Filling Equipment

ENFit Cap with
Tamper Evident Feature

ENFit Spout

9mm Cap with Tamper
Evident Feature

9mm Spout

CAP FOR SPOUT AND MODIFIED SPOUT

CROSS REFERENCE TO RELATED APPLICATION

This Patent Application claims the benefit of U.S. Provisional Application, Ser. No. 63/014,512, filed on 23 Apr. 2020, and U.S. Provisional Application, Ser. No. 63/162,828, filed on 18 Mar. 2021. By the above claim, both U.S. Provisional Patent Applications are incorporated by reference into this specification, each in its entirety and each is made a part of this specification, including but not limited to the following disclosure.

BACKGROUND OF THE INVENTION

Field of the Invention

This invention relates to an apparatus and a method for varying the internal design of a prior art spout while maintaining the external design of the prior art spout, in order to increase flowrates of fluid passing through the prior art spout and also to reduce fill times in the manufacturing processes. This invention also relates to caps for tube feeding containers that have 2 or more connection portal types for feeding patients through 2 or more tube feeding systems.

Discussion of Related Art

Some conventional spouts have a standardized design of a body, particularly when used for small-bore connectors for liquids and/or gases in a healthcare application, and the standardized design often includes the spout having a standardized upper portion, a standardized external thread on the standardized upper portion, and a standardized internal flange interfering with a fluid flow through the spout. Also, some conventional standards prevent or deter from varying the internal dimensions or internal configuration and/or design of the spout, particularly spouts following or made according to International Standard ISO 80369-3, which requires the external or outside design, dimensions and/or shapes of the spout to remain constant. There is an apparent need for a standardized spout that can be modified internally while maintaining constant dimensions and shapes of the spout which are important, including the standardized upper portion and the standardized external thread on the standardized upper portion.

Several conventional systems and methods for attaching or connecting tube feeding systems have different designs for completing a food delivery system or method, for example, an enteral feeding tube to a patient. Conventional caps have been used to close or seal containers for food used in enteral feeding. Many conventional systems and methods include relatively high-cost equipment that cannot be easily reused and consistently interchanged between different feeding components of the feeding systems and methods.

Many different known devices and methods are used as an enteral feeding tube or a tube feeding system to deliver a liquid food to a patient. For example, Ingram et al., U.S. Pat. No. 10,307,335, the entire disclosure of which is incorporated into this specification by reference thereto, describes a container for collecting, transporting, storing, delivering and dispensing fluid. The container has a hollow tube with an outer circumference diameter and is configured to receive a plunger. A collection adaptor and a dispensing adaptor provide interchangeable coupling of a variable volume container, such as a syringe with a collection device and a dispensing device. The container has a circumferential seal assembly secured at one end of the hollow tube. The seal assembly outer diameter is substantially similar to the hollow tube outer diameter.

A number of other tube feeding systems exist in the marketplace, which has complicated the manufacturing process for making caps and for capping the variously sized and shaped tube feeding containers. There is an apparent need for a simplified method of capping a variety of differently sized and shaped tube feeding containers.

SUMMARY OF THE INVENTION

According to different embodiments of this invention, a direct connect tube feeding nutrition device or system can include or be a complete system or a turnkey solution, particularly one that does not require non-standard or unique enteral or other nutrition filling equipment tooling.

According to some embodiments of this invention, it is possible to quickly and efficiently change over the nutrition filling equipment machine to produce different tube feeding containers while maintaining any required cleanliness and safety requirements or standards corresponding to the different tube feeding systems.

In some embodiments according to this invention, it is possible to change the internal design of a standardized conventional or prior art spout, such as spouts made according to particular standards and specifications, for example, to increase flowrates of fluids flowing or passing through the spout and to reduce filling times necessary for manufacturing processes, while maintaining any required external design of the prior art spout to maintain or keep the standardized prior art spout so that the spout can be easily and consistently attached and/or adapted to in the field or public, particularly in connection with and when used for small-bore connectors for liquids and/or gases in healthcare applications.

In some embodiments of this invention, there is a complete process or a "turn-key" system that allows customers or users to fill any suitable product, such as a food, into a custom pouch or a container that provides the flexibility of using one outer cap design with two different types of cap connections. In some embodiments of this invention, the filling line provides a reduced set up time through the use of a capping system that will use the same feeder bowl and tracks to deliver either style cap without extra set-up time. In some embodiments of this invention, this is achieved through the design of an ENFit cap to share the same outside geometry as a conventional 9 mm cap already in the marketplace. Some embodiments of this invention provide for a lab filling line as well as a production filling line that uses these shared tracks and feeder bowls for the caps. In some embodiments of this invention, the fitments load on the same rails but require unique feeder bowls.

BRIEF DESCRIPTION OF THE DRAWINGS

Different objects of this invention can be accomplished with certain spouts, caps and/or other elements of enteral or tube feeding systems or devices, according to different embodiments of this invention, wherein.

DESCRIPTION OF THE INVENTION

Figure 1:
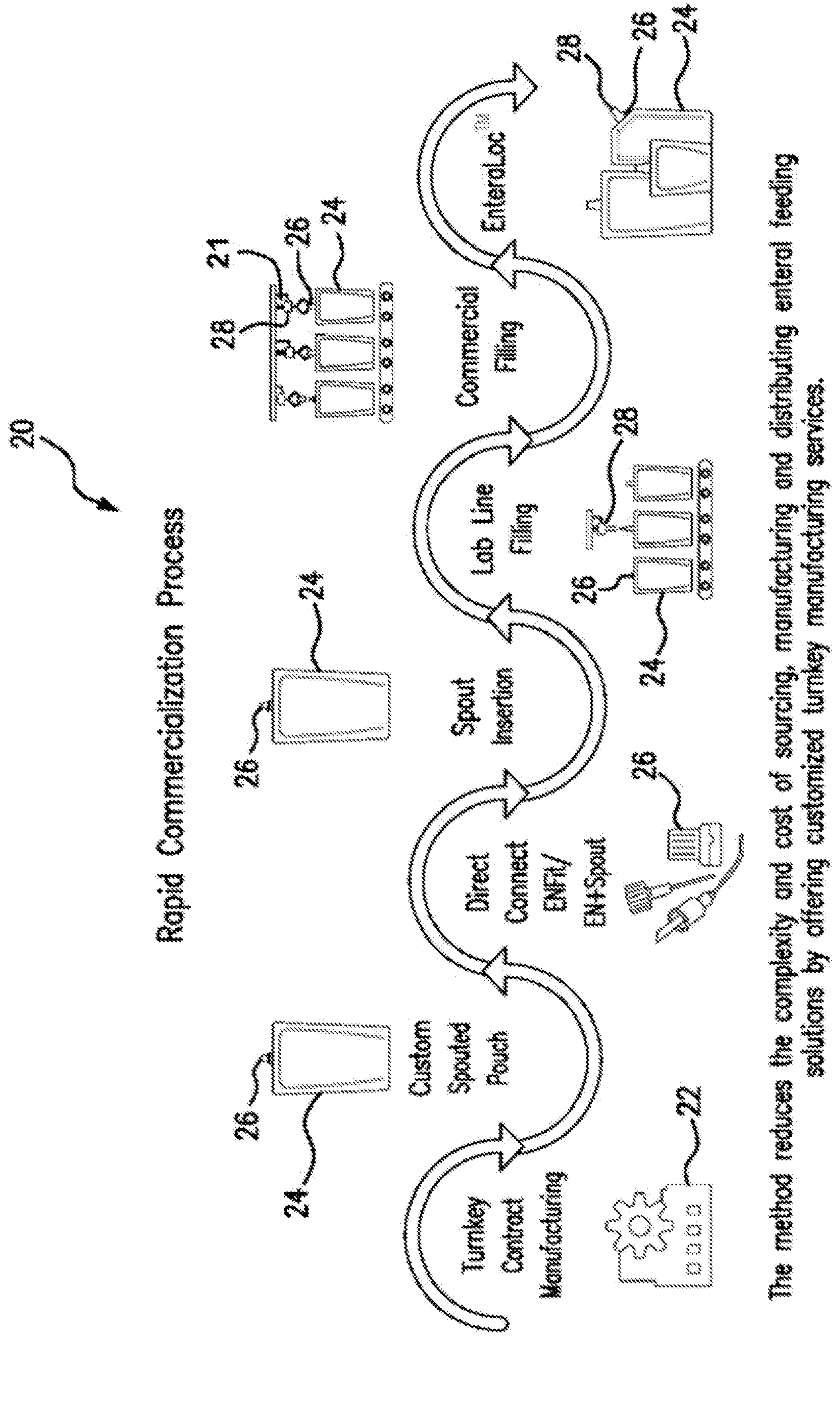
FIG. 1 shows a flowchart of a rapid commercialization process, according to one embodiment of this invention.

FIG. 1 shows a flowchart view of rapid commercialization process or method 20, according to one embodiment of this invention. As shown in FIG. 1, machine or apparatus 22 produces or manufactures pouch or container 24, for example, according to any suitable manufacturing process or method known to those skilled in the art of manufacturing flexible containers, particularly environmentally clean flexible containers 24. Any suitable manufacturing process or method can be used to produce or make sterile or clean containers 24, particularly ones that can be used for healthcare applications, enteral feeding tubes, components and/or systems.

As shown in FIG. 1, according to some embodiments of this invention, after container 24 is formed or manufactured, one or more spouts 26 can be connected to, attached to and/or inserted within any suitable surface and/or portion of container 24. In some embodiments of this invention, spout 26 forms a seal, such as a hermetic seal, that prevents container 24 and/or spout 26 from leaking outside of container 24. In some embodiments of this invention, container 24 and spout 26 are used in a healthcare application system, an enteral feeding system and/or another suitable feeding system, such as for a patient.

As shown in FIG. 1, according to some embodiments of this invention, a suitable cap 28 is connected to, attached to and/or otherwise held in position with respect to spout 26, particularly different embodiments of spouts 26 such as shown in FIGS. 1, 5, 7 and 9-23. In some embodiments of this invention, cap 28 forms a seal, such as a hermetic seal, which can be particularly useful for containing food and/or another suitable substance within a healthcare application system, an enteral or other type of feeding system, such as for a patient. FIG. 1 also shows the produced container 24, spout 26 and cap 28, connected and/or assembled according to different embodiments of this invention, particularly manufacturing processes as known by those skilled in the art of flexible container manufacturing.

According to some embodiments of this invention, particularly with rapid commercialization process 20, such as shown in FIG. 1, it is possible to reduce the complexity and cost of sourcing, manufacturing and/or distributing enteral feeding systems and/or other suitable feeding systems, particularly by providing manufacturers and/or suppliers with turnkey manufacturing processes and/or methods that allow the manufacturer to customize the end product and/or also adapt to the particular needs of different feeding pouches and/or feeding bowls.

Figure 2:
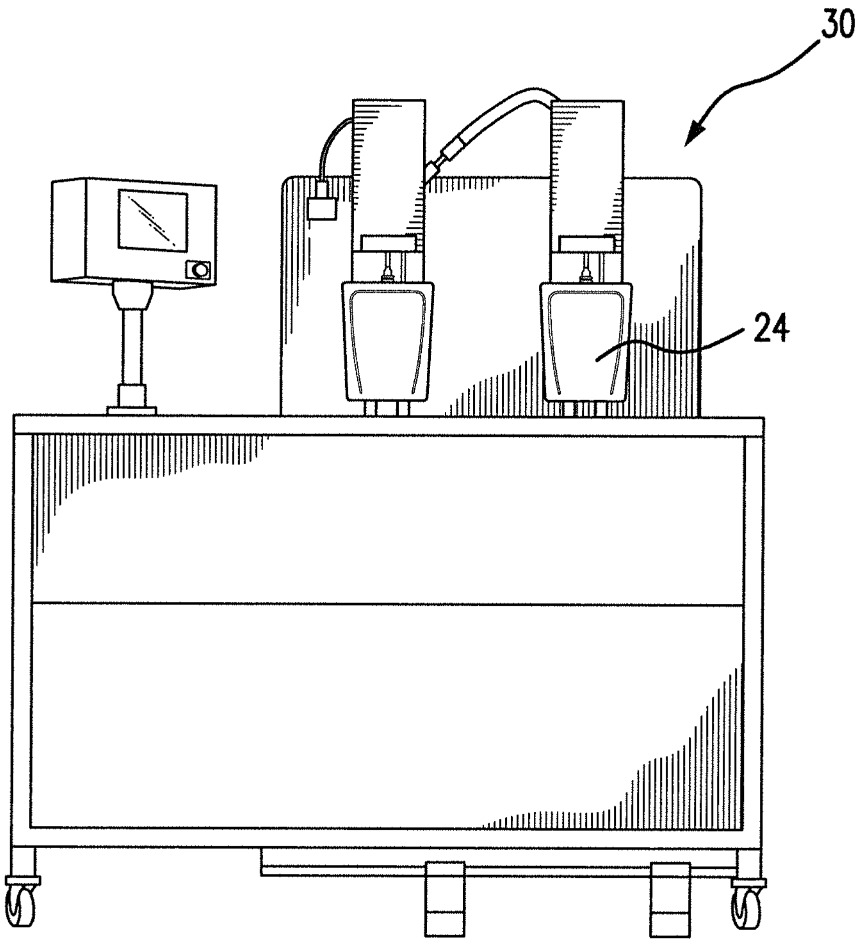
FIG. 2 shows a perspective front view of a filling device or apparatus, according to one embodiment of this invention.

FIG. 2 shows filler 30, according to one embodiment of this invention. In some embodiments of this invention, filler 30 includes any suitable filling machine and/or device that can be used to fill container 24, particularly in a sterile and/or clean environment and so that container 24 is preferably sterile and ready for use in a healthcare application system, an enteral feeding system and/or other patient feeding system.

Figure 12:
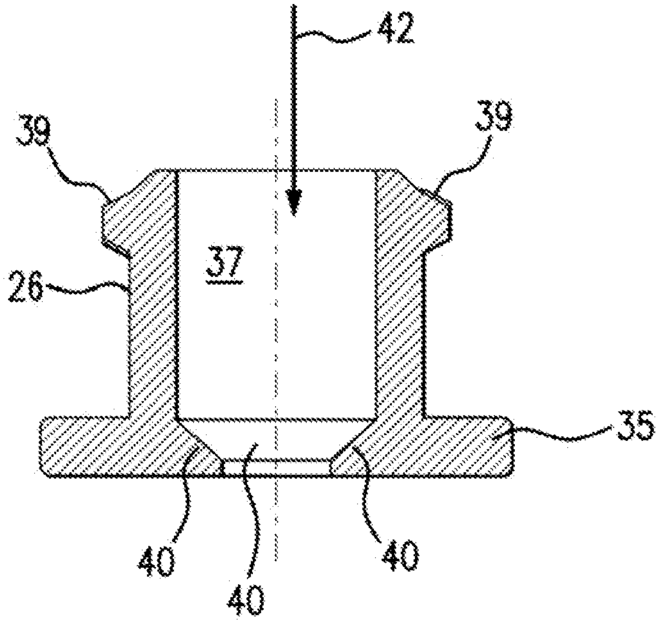
FIG. 12 (Prior Art)
FIG. 12 shows a front cross-sectional view of a prior art spout and female portion of a connector, according to International Standard ISO 80369-3.

FIG. 12 shows a prior art connector that is standardized in designs, sizes and/or dimensions, according to International Standard ISO 80369-3, as shown on Page 13, which are used for small-bore connectors for liquids and gases in healthcare applications, including connectors for healthcare applications and/or enteral applications. The entire disclosure of International Standard ISO 80369-3 is incorporated into and made a part of this specification by reference thereto. The main portion of the prior art spout 26, as shown in FIG. 12, that requires uniform design or standardization is upper portion 39 and some of the external dimensions, including thread dimensions, of spout 26 as shown in FIG. 12. For standardization purposes, in some embodiments, it is important for spout 26 as shown in FIG. 12 to keep or maintain the external dimensions and the thread dimensions and less important for spout 26 to maintain the internal dimensions and internal design configurations. For example, as shown in FIG. 12, body 35 of spout 26 forms internal void 37 near a lower position and/or a downstream position of internal void 37 as shown in FIG. 12. In some embodiments of this invention, such as shown in FIG. 12, during a filling process of container 24, fluid flowing through internal void 37 of spout 26 experiences a flow restriction at or caused by flange 40. According to some embodiments of this invention, internal void 37 communicates or is in fluidic communication with a void formed by container 24 and fluid flows in a downstream direction when filling container 24 and in an opposite upstream direction when container 24 is used to discharge the liquid and/or gas from container 24, such as when feeding a patient with liquid food.

Figure 13:
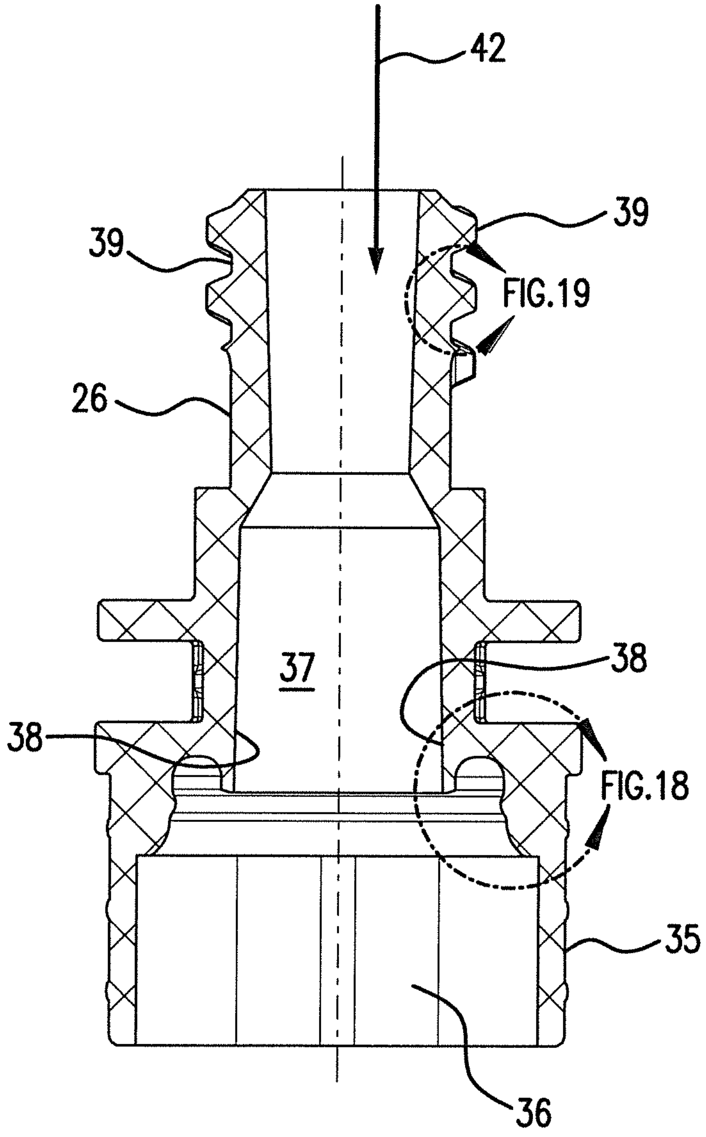
FIG. 13 shows a front cross-sectional view of a portion of a spout and a connector, according to one embodiment of this invention.
Figure 14:
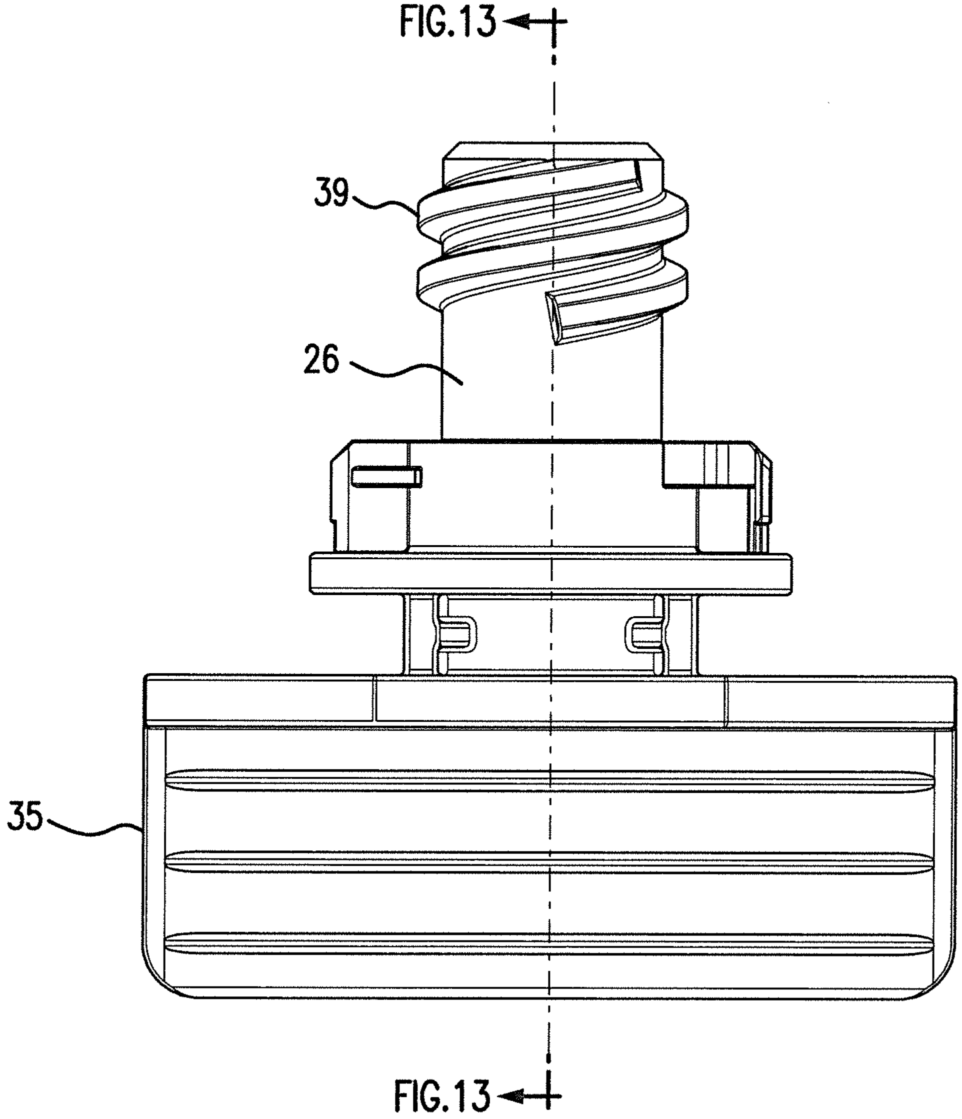
FIG. 14 shows a front view of a spout and a connector, according to one embodiment of this invention.
Figure 15:
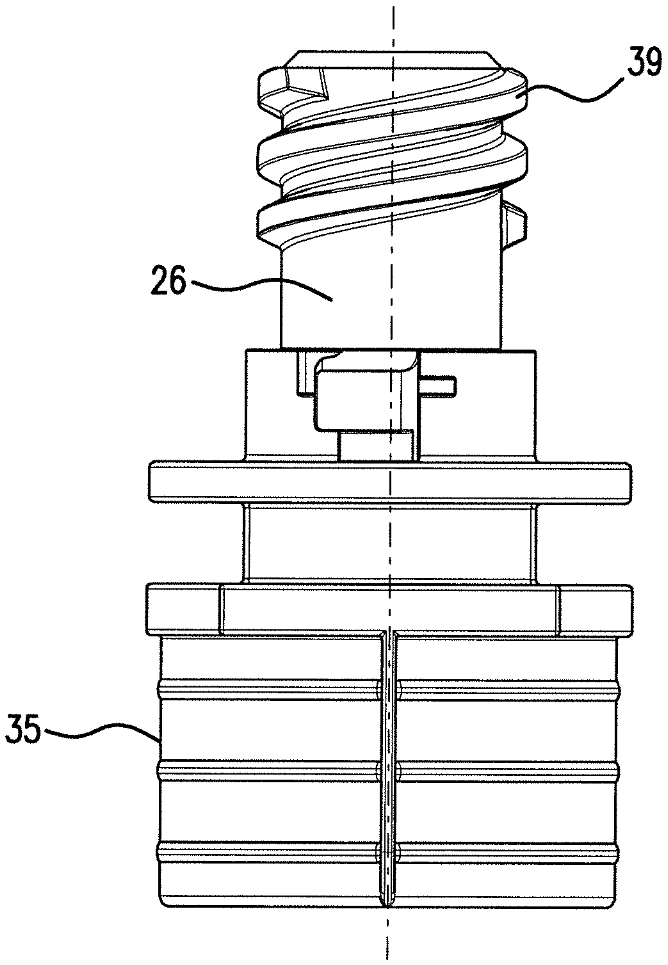
FIG. 15 shows a side view of a spout and a connector, according to one embodiment of this invention.
Figure 16:
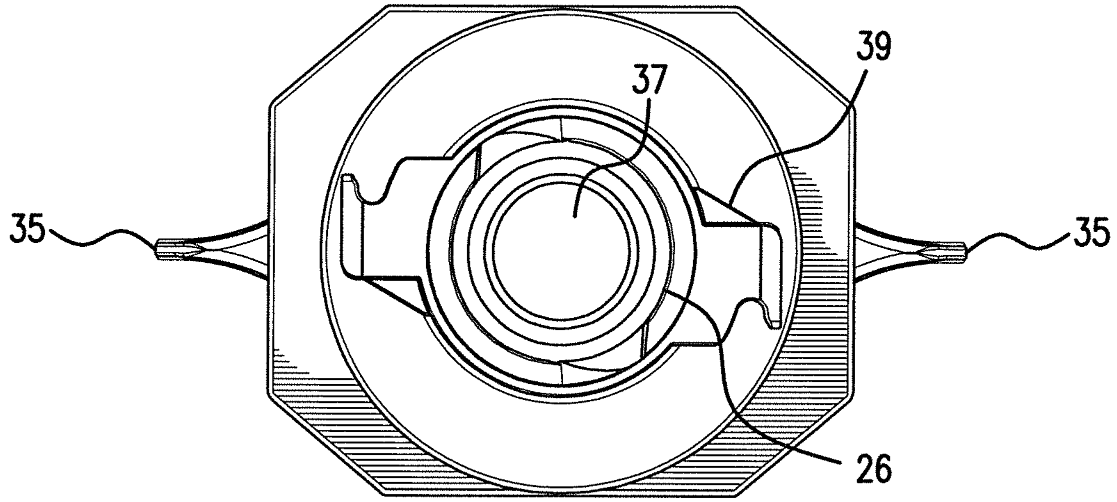
FIG. 16 shows a top view of a spout and a connector, according to one embodiment of this invention.
Figure 17:
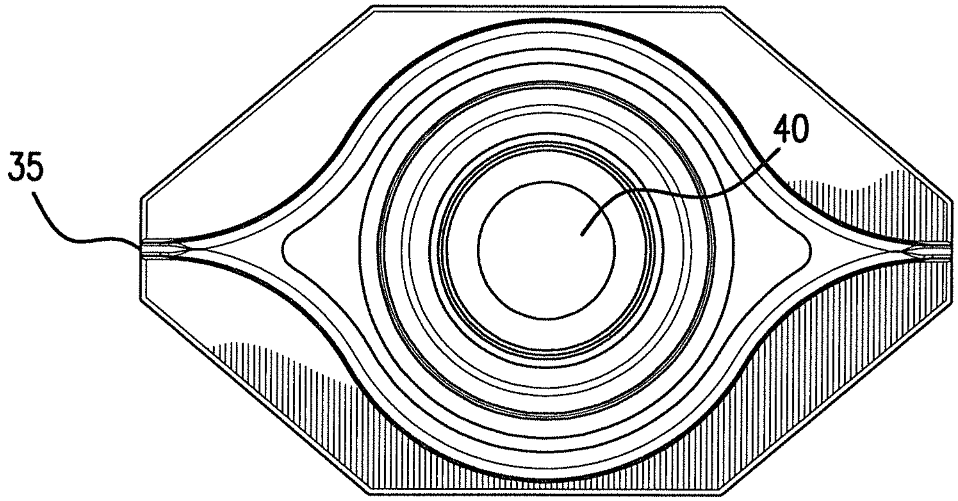
FIG. 17 shows a bottom view of a spout and a connector, according to one embodiment of this invention.
Figure 18:
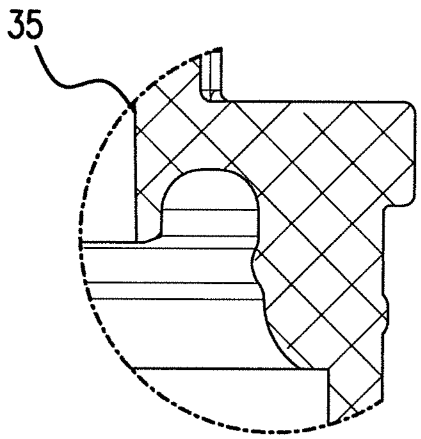
FIG. 18 shows a sectional view of spout and a connector, showing a section area in FIG. 13.
Figure 19:
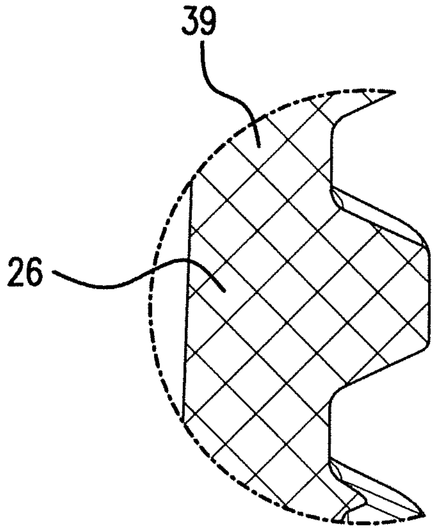
FIG. 19 shows a sectional view of spout and a connector, showing a section area in FIG. 13.
Figure 20:
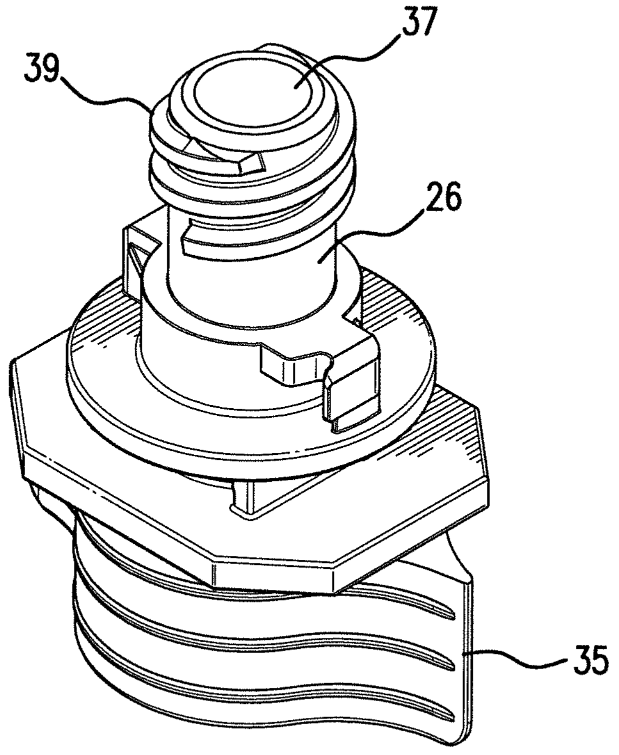
FIG. 20 shows a perspective top view of a spout and a connector, according to one embodiment of this invention.
Figure 21:
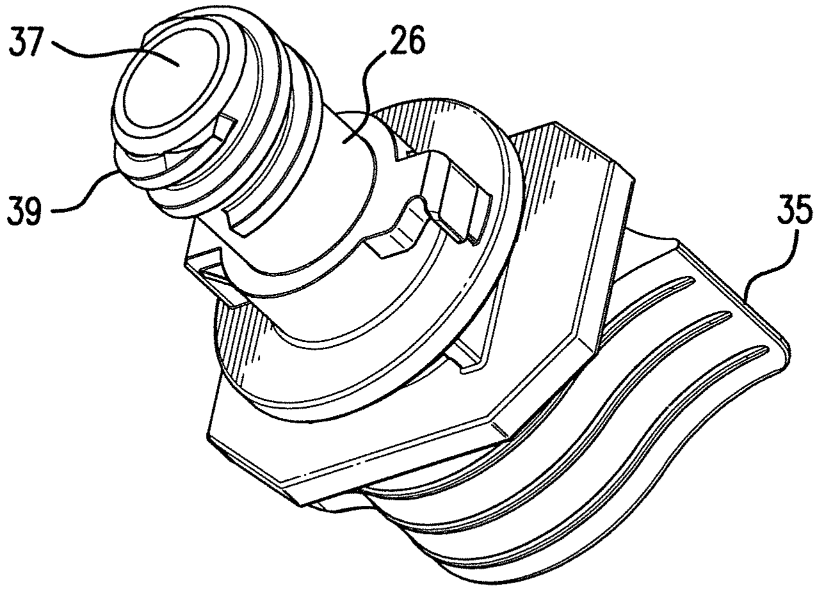
FIG. 21 shows a perspective side view of a spout and a connector, according to one embodiment of this invention.
Figure 22:
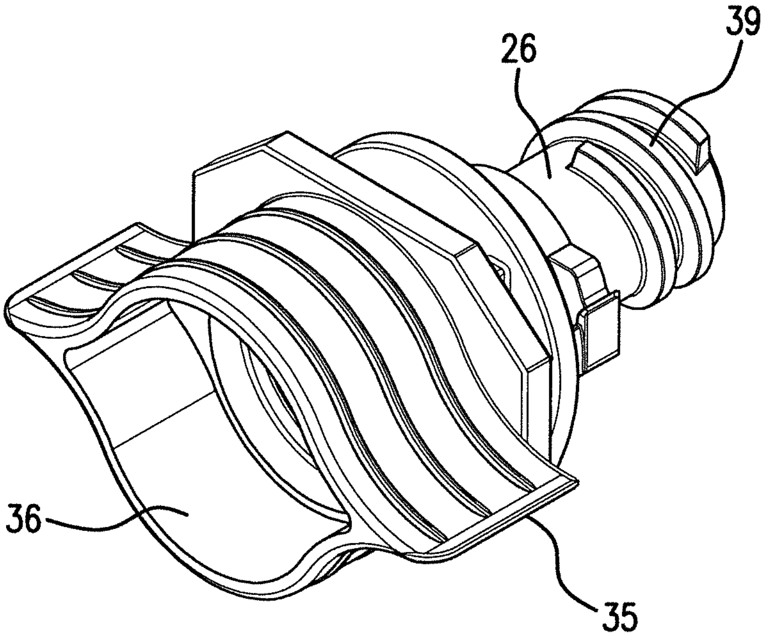
FIG. 22 shows a perspective bottom view of a spout and a connector, according to one embodiment of this invention.
Figure 23:
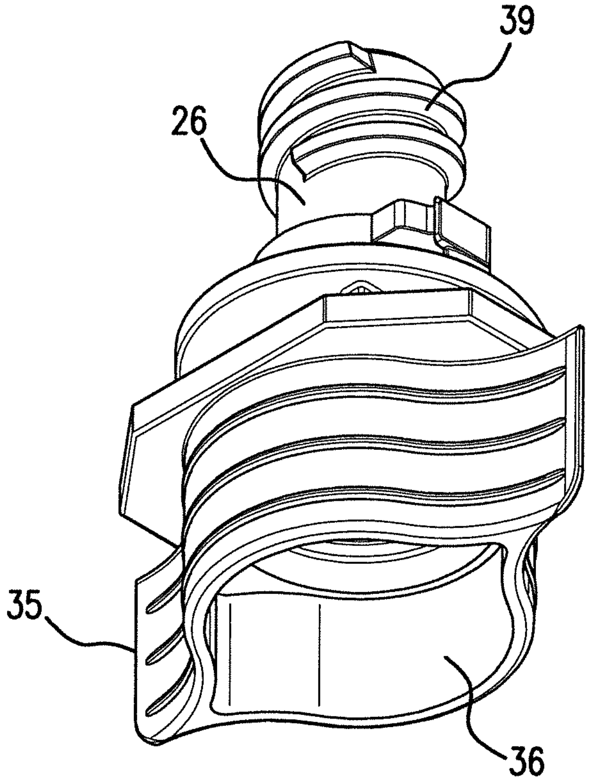
FIG. 23 shows a perspective side view of a spout and a connector, according to one embodiment of this invention.

During a manufacturing process for filling container 24, according to some embodiments of this invention, such as shown in FIG. 1, filling nozzle 21 is inserted into void 7 of spout 26 and during normal filling procedures, fluid flows through filling nozzle 21 and the fluid flows in the direction of arrow 42, as shown in FIGS. 12 and 13, and into container 24 which is secured, connected and/or otherwise attached with respect to container 24. According to some embodiments of this invention, in order to achieve an increased flowrate during the filling process, it can be advantageous to remove at least a portion of and possibly all of flange 40 as shown in FIG. 12, in order to reduce the fluidic flow restrictions and increase the flowrate and/or filling time to fill or at least partially fill each container 24, In different embodiments of this invention, it is possible to remove different portions of flange 40 and/or redesign internal void 37 and/or flange 40, for example internal components of spout 26, to achieve a particular or desired flow pattern, a flowrate and/or a filling time.

In some embodiments according to this invention, an improvement relates to increasing the opening of internal void 37 to allow or permit the insertion of a larger filling nozzle into internal void 37. According to some embodiments of this invention, reducing internal flange 40 allows or permits the use of a larger filling nozzle.

In some embodiments of this invention, an internal geometry, such as of internal flange 40 is eliminated or enlarged to allow improved flow through spout 26. In some embodiments where geometry is important or critical, it is beneficial to define a current range versus an improved range. For example, in some embodiments of this invention the standardized design typically has an internal geometry with a body, a common range of internal openings and an area flow path with certain parameters. In other embodiments of this invention the non-standardized or improved design has certain other improved internal geometry with a body, an improved range of internal openings and an area flow path with certain parameters. In some embodiments of this invention, the improved design offers a significant increase in the flow path area, which enhances filling speeds and can be better suited for filling higher viscosity products which pass through spout 26.

In some embodiments of this invention, such as shown in FIG. 13, the entire flange 40 is removed to non-restrict or open fluid flow through spout 26 and thus increase and achieve a desired flowrate and/or filling time. In some embodiments of this invention, it is possible to vary the size, shape and/or design of flange 40, in order to vary the flow pattern, the flowrate and/or the filling time for filling container 24. According to some embodiments of this invention, such as shown in FIG. 13, the entire flange 40 is removed to provide open wall 38, or wall 38 having at least a portion of flange 40 removed, to allow fluid to flow relatively more unrestricted in the direction of arrow 42. Removing at least a portion of flange 40 can significantly decrease the filling time and thus the manufacturing time and/or costs required to fill container 24.

In some embodiments of this invention, removing flange 40 does not affect fluid flowing in a reverse direction, such as when using container 24 for feeding purposes. Also, when varying the internal dimensions or internal configuration and/or design of spout 26, according to International Standard ISO 80369-3, in some embodiments of this invention, the external or outside design, dimensions and/or shapes of spout 26 can remain constant but the internal design of spout 26 can be changed or modified and still allow spout 26 to conform to International Standard ISO 80369-3.

Figure 3:
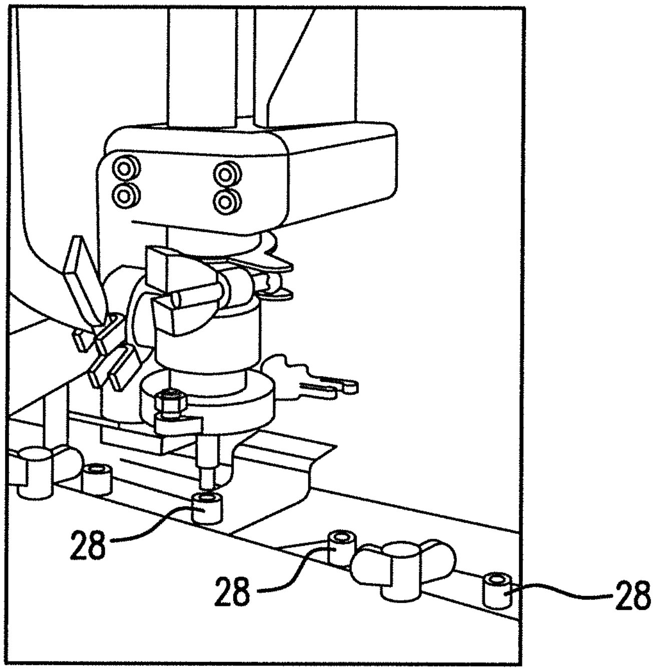
FIG. 3 shows a perspective front view of a device or assembly for molding or otherwise manufacturing caps and/or closures, according to one embodiment of this invention.

FIG. 3 shows a manufacturing process or method step used to manufacture caps 28, according to different embodiments of this invention. Caps 28 can have any suitable design, size and/or shape and/or can be made of any suitable material for the intended purpose of use with healthcare applications, enteral feeding systems and/or other suitable feeding systems, particularly when associated with a patient. In some embodiments according to this invention, the same or differently designed caps 28 can be designed, selected and/or fitted to seal and/or close the different embodiments of spout 26, particularly as shown FIGS. 1, 5, 7 and 9-23. In some embodiments of this invention, caps 28 have different colors, for example, to identify individual different caps 28, such as differently designed, sized and/or shaped caps 28.

Figure 5:
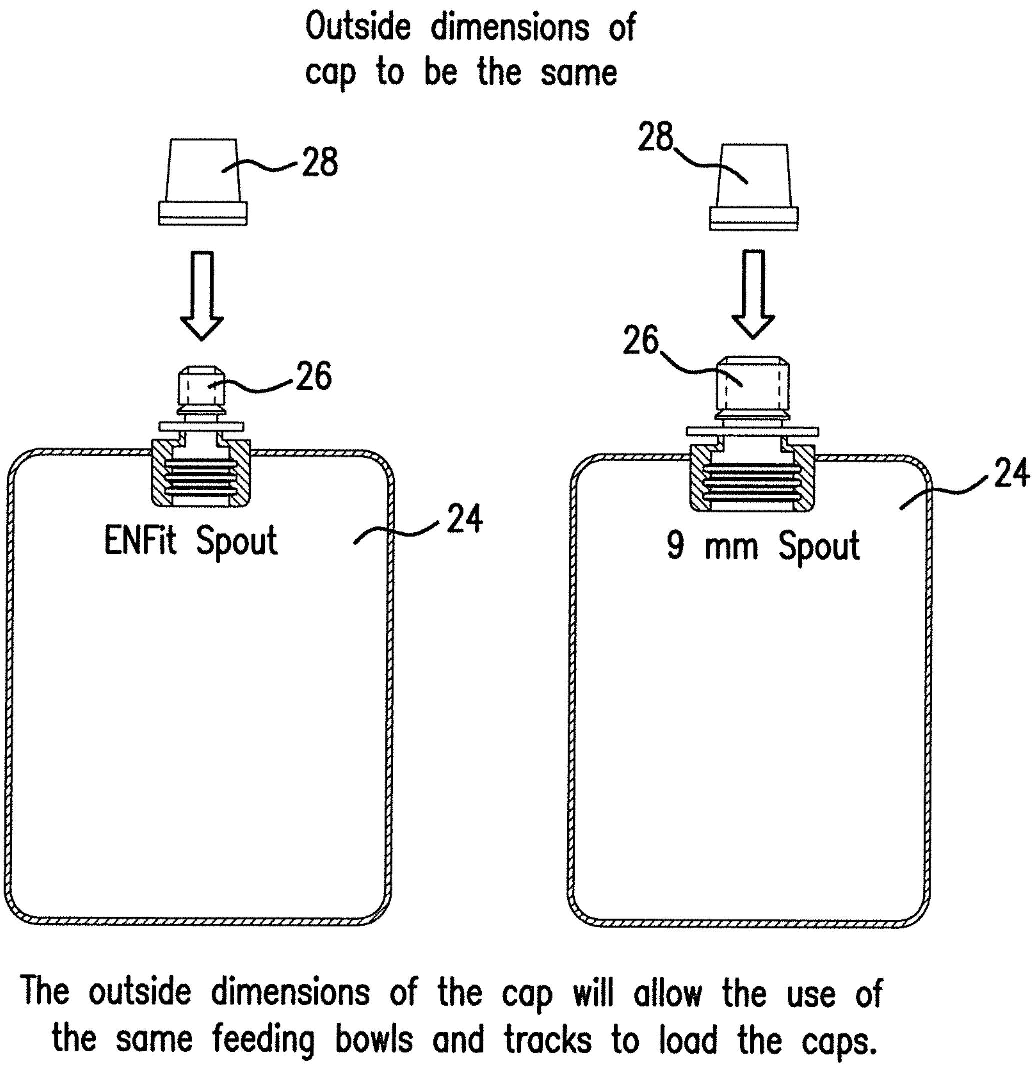
FIG. 5 shows a front view, not to scale, of a method step for attaching caps to containers, according to one embodiment of this invention.
Figure 6:
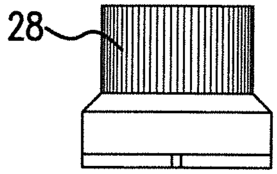
FIG. 6 shows a front view of a cap, according to one embodiment of this invention.
Figure 7:
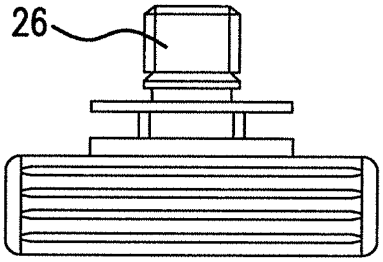
FIG. 7 shows a front view of a spout, according to one embodiment of this invention.

In some embodiments according to this invention, such as shown in FIGS. 5 and 6, for example, caps 28 have an outside shape and/or dimension that is the same outside shape and/or dimension for cap 28 so that cap 28 can accommodate 2 or more different embodiments of spouts 26, even if caps 28 can be fitted and/or attached to differently sized spouts 26 of containers 24, for example, such as shown in FIGS. 1, 5, 7 and 9-23. In some embodiments of this invention, such as shown in FIGS. 1, 5, 7 and 9-23, spout 26 of each tube feeding container 24 can have different designs, sizes and/or shapes of connections suitable for connecting to a corresponding healthcare application system and/or tube feeding system. In some embodiments of this invention, an ENFit cap 28 can only fit on and be used with an ENFit spout 26. In some embodiments of this invention, if certain outside dimensions of caps 28 are standardized then such caps 28 can have different internal dimensions and can be used on two or more differently sized spouts 26, such as shown in FIGS. 1, 5, 7 and 9-23. In some embodiments of this invention, an outer portion of cap 28 is the same, while an inner connection portion can be different. Thus, in some embodiments of this invention, it is possible to use the same or similar design, particularly the outside dimensions, of cap 28 for two or more differently designed, sized and/or shaped spouts 26. This particular design, size and/or shape feature of this invention is particularly suitable for allowing one particular design, size and/or shape of cap 28 to be used with two or more differently sized spouts 26, such as from different manufacturers for healthcare application systems, enteral feeding systems and/or other suitable feeding systems. This particular feature of this invention can save significant manufacturing time and costs associated with changeovers in the filling and fabricating process from one container type to another container type with a different connection type, particularly tube feeding containers connecting to the tube feeding systems. This particular feature can also save significant costs associated with the changeovers in the cap manufacturing process particularly from one cap type to another cap type.

Figure 4:
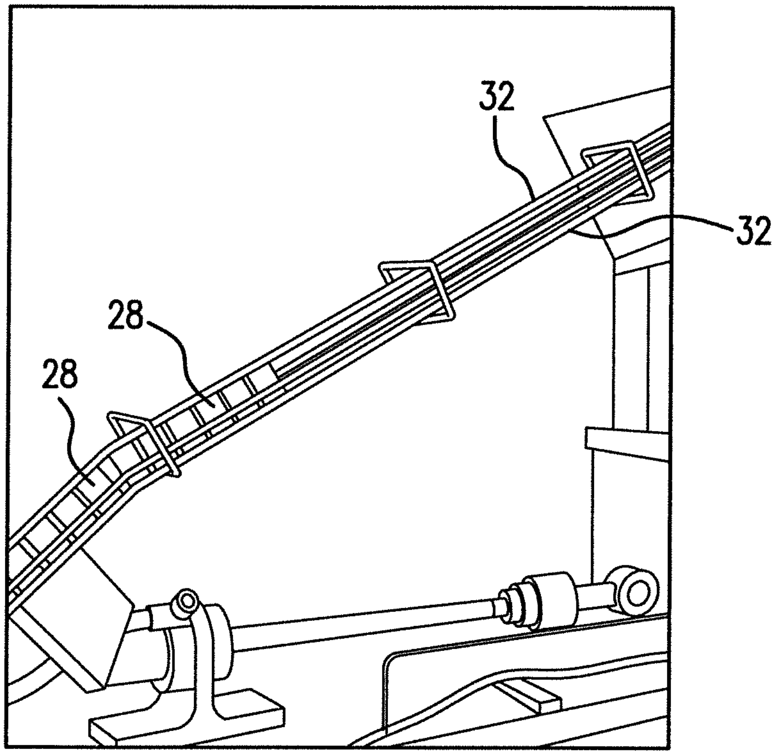
FIG. 4 shows a perspective front view of a commercial or industrial filling system or equipment having a feeding track for components such as caps and/or closures, according to one embodiment of this invention.

FIG. 4 shows a commercial or industrial filling method or process, according to some embodiments of this invention. As shown in FIG. 4, tracks 32 are used to route, transfer and/or otherwise move caps 28 through the manufacturing process or method. Any other suitable tracks 32 can have a different design and/or shape that can be used in addition to and/or in place of tracks 32 as shown in FIG. 4.

Figure 8:
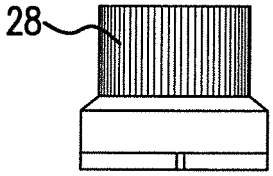
FIG. 8 shows a front view of a cap, according to one embodiment of this invention.
Figure 9:
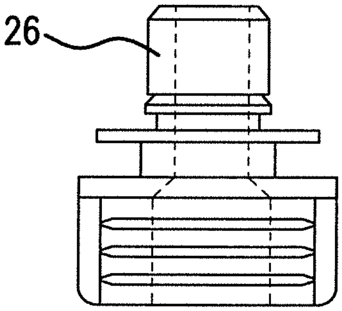
FIG. 9 shows a front view of spout, according to one embodiment of this invention.

As shown in FIGS. 5, 6 and 8, in some embodiments of this invention, caps 28 can have the same or similar external or outside designs, sizes and/or shapes and caps 28 can have or be manufactured with different internal or inside designs, sizes and/or shapes, for example, to accommodate and/or sealably engage with differently sized spouts 26, such as shown in FIGS. 1, 5, 7 and 9-23. In some embodiments of this invention, caps 28 have the same outside footprint or configuration to allow a filling operation to use the same feeding tracks 32 and/or vibratory bowls, for example, with different spouts 26 in different embodiments of this invention.

According to some embodiments of this invention, cap 28 as shown in FIG. 6 can have any suitable design, shape and/or size that allows cap 28 to be interchangeably engaged and/or used with spout 26, for example, as shown in FIGS. 1, 5, 7 and 9-23. According to some embodiments of this invention, such as shown in FIG. 5, cap 28 having certain external dimensions and shapes, such as shown on the left side of FIG. 5, can be used on a particular size of ENFit spout 26 and a different cap 28 with the same external dimensions but different internal dimensions can be used on a differently sized 9 mm spout 26, such as shown on the right side of FIG. 5. In some embodiments of this invention, cap 28 is used on another differently designed, shaped and/or sized conventional or existing spout 26, particularly while maintaining the same design, shape and/or size of cap 28. According to some embodiments of this invention, cap 28 has an internal design to fit and/or engage with a full thread spout 26 or a tab style thread, for example, as shown in FIG. 11.

Figure 10:
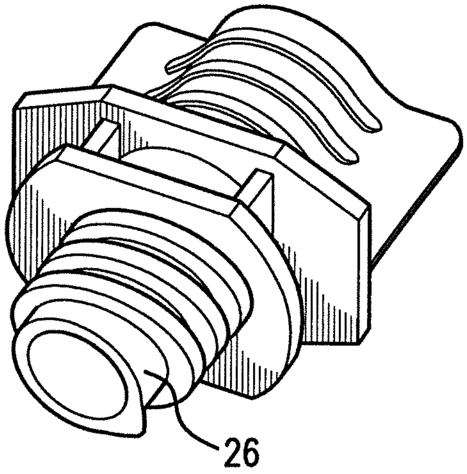
FIG. 10 shows a perspective front view of a full thread concept for retort, such as an ENFit concept, according to one embodiment of this invention.
Figure 11:
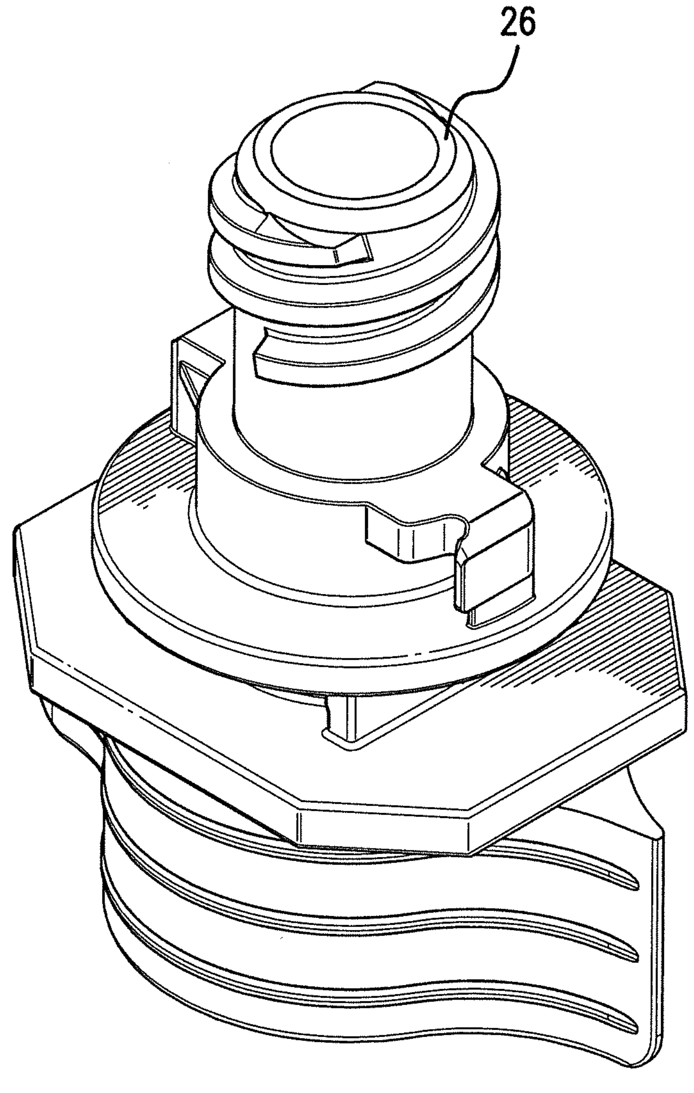
FIG. 11 shows a perspective front view of a spout, according to one embodiment of this invention.

According to some embodiments of this invention, FIG. 10 shows a full thread concept for retort which can be based on an ISO standard. In some embodiments of this invention, it is possible to use spout 26 in such a manner that will provide enough sealing torque to stay seated on a filled pouch or container 24 that will go through a retort process which can place or position the pouch or container 24 in an environment that subjects the pouches or containers 24 and/or spouts 26 to an elevated pressure environment.

In some embodiments of this invention, it is possible to provide a turnkey contract manufacturing operation, which can include services related to product design, prototyping, tooling and assembly line production, acquisition of materials, testing, product certifications and/or complete supply chain management through filling operations processes and/or methods.

In some embodiments of this invention, particularly in healthcare applications and settings, body 35 has a standardized design and is used in connection with known or conventional small-bore connectors which are particularly useful for liquids and/or gases in hospital settings or other healthcare applications.

According to some embodiments of this invention, spout 26 has a standardized upper portion 39. In some embodiments, upper portion 39 has a standardized external thread with standard dimensions and/or shapes that correspond to one or more standard and/or conventional designs, for example, according to International Standard ISO 80369-3. In other embodiments of this invention, upper portion 39 has a non-standardized external thread with non-standard dimensions and/or shapes that correspond to one or more non-standard designs, and these other embodiments may or may not be used in healthcare applications.

In some embodiments of this invention, such as those having a standardized internal flange 40, an improvement to internal flange 40 includes removing or deleting, either partially or completely, the standardized or non-standardized internal flange 40. According to some embodiments of this invention, body 35 has or forms internal void 37 though which any suitable liquids and/or gases flow or can pass or flow. In some embodiments of this invention, at least a portion or all of the standardized or non-standardized internal flange 40 is removed, for example, to reduce a fluidic flow restriction caused by the standardized internal flange 40 and increase a flow area and/or a cross-sectional area of internal void 37. In some embodiments of this invention, eliminating or reducing at least a portion of or eliminating or reducing all of internal flange 40 reduces the flow restriction and thus allows the liquids and/or gases to flow and/or pass as a fluid through internal void 37 of body 35. The amount of internal flange 40 removed or deleted can be varied to correspondingly vary the fluidic flow characteristics of the liquids and/or gases and thus can be used to improve one or more fluidic flow characteristics and thereby achieve increased flowrates, reduced flow times and/or reduced pressure drops of the fluid, such as the liquids and/or gases, flowing and/or passing through internal void 37 of body 35.

In some embodiments of this invention, the entire standardized internal flange 40 is removed to increase the fluidic flowrate and thereby reduce the time necessary to fill another connected and/or attached device, such as one or more containers 24 according to this invention. According to some embodiments of this invention, internal void 37 is sized large enough and/or sized in shapes and/or dimensions to reduce or minimize the fluidic flow restriction and thereby improve and/or otherwise vary the fluidic flow characteristics.

In some embodiments of this invention, for example as shown in FIG. 13, body 35 comprises or has internal wall 36 forming or at least partially forming internal void 37. In some embodiments, internal void 37 is standardized and has specific or particular dimensions and/or shapes and in other embodiments, internal void 37 is non-standardized and has non-standardized dimensions and/or shapes. In some embodiments, at least a portion or all of internal flange 40 is minimized, removed and/or reduced which results in increased fluidic flowrates and/or reduced filling times of the liquid and/or gas fluidic flowing through internal void 37 of body 35.

According to some embodiments of this invention, internal wall 36 forms and/or has a straight wall section of wall 38, such as shown in FIG. 13, positioned at or near to a discharge area of internal void 37. In some embodiments, the straight wall section is formed by removing at least a portion of or all of internal flange 40 and thus improving or enhancing fluidic flow characteristics of the liquids and/or gases passing or flowing through internal void 37 of body 35.

In some embodiments of this invention, in a filling flow direction, for example as shown or represented by arrow 42 in FIGS. 12 and 13, the flow area and/or cross-sectional area of internal void 37 formed by internal wall 36 forms or creates an increased or enlarged fluidic flow section or cross-sectional area of internal void 37. In some embodiments, in the filling flow direction, the fluidic flow or fluid flowing or passing through internal void 37 of body 35 is increased or enlarged. In some embodiments of this invention, body 35 is secured, connected and/or otherwise attached to container 24 and fluid, such as the liquid and/or gas flowing or passing though internal void 37 in the filling flow direction, flows or passes through internal void 37, and in a suitable manufacturing method or process allows or results in the liquid and/or gas o flow or pass through internal void 37 with increased or enhanced fluidic flow characteristics which can reduce fill times and increase manufacturing efficiency.

In some embodiments of this invention, to accomplish a fill of container 24, for example, a conventional filling nozzle 21, such as shown in FIG. 1, is removably mounted within internal void 37, such as in, at and/or near upper portion 39, and is preferably but not necessarily sealed with respect to body 35, preferably to result in filling container 24 with a fluid, such as the liquid and/or gas. In some embodiments of this invention, the conventional filling nozzle 21 is then removed and cap 28 is then sealably mounted to spout 26.

According to some embodiments of this invention, methods can be used to improve standardized designs of body 35, including but not limited to small-bore connectors used for or in connection with liquids and/or gases, particularly in healthcare applications. In some embodiments, the standardized designs include or have spout 26 with a standardized upper portion 39, a standardized external thread on the standardized upper portion 39, and body 35 forms a standardized internal flange. In some embodiments, the improved method includes forming or creating internal void 37 though which the liquids and/or gases flow or pass through body 35 and removing at least a portion of or all of the standardized internal flange 40. According to some embodiments, increasing a flow area or a cross-sectional area of internal void 37 can be used to reduce a flow restriction caused by standardized internal flange 40 and thus result in increased manufacturing efficiencies including but not limited to reduced filling times of containers 24 and corresponding manufacturing cost savings.

While in the foregoing detailed description this invention has been described in relation to certain preferred embodiments thereof, and many details have been set forth for purposes of illustration, it will be apparent to those skilled in the art that this invention is susceptible to additional embodiments and that certain of the details described herein can be varied considerably without departing from the basic principles of this invention.

We claim:

1. A body for small-bore connectors for liquids and/or gases in a healthcare application, the body comprising:

a spout with an upper portion, an external thread on the upper portion, the body having an internal wall forming an internal void though which the liquids and/or gases flow, and in a filling flow direction a flow area of the internal wall forming an enlarged section of the internal void, the spout sealably attached to a closed container, during a filling time the liquids and/or gases flow in a first flow direction through the internal void and at least partially fill the closed container with the liquids and/or gases, and a cap configured to move along a track and attach to the spout to close the spout, and during a feeding time the cap is removed from the spout and the liquids and/or gases have a flow through the internal void in a second flow direction which is reversed compared to the first flow direction and at least partially fill with the liquids and/or gases an enteral feeding system connected to the spout, wherein the upper portion of the spout is selected from the group consisting of: a first upper portion configuration, and a second upper portion configuration that is different from the first upper portion configuration, and the cap is selected from the group consisting of: a first cap having a first internal connection configured to attach over the first upper portion configuration, and a second cap having a second internal connection configured to attach over the second upper portion configuration, wherein the first cap and the second have a same outside geometry.

2. The body according to claim 1, wherein the spout has an elongated neck portion, the external thread includes two external threads, and the cap has internal threads mating with the two external threads of the spout to provide enough sealing torque to maintain the cap on the spout when the cap and the spout are exposed to an elevated pressure environment.

3. The body according to claim 1, wherein the body forms a lower portion having a non-circular shape with pointed ends, and an outside surface of the lower portion has a plurality of elongated ribs secured to the closed container to permanently seal the closed container to the spout.

4. The body according to claim 1, wherein the body forms a plurality of tamper evident arms, an inside surface of the cap forms a recess, each tamper evident arm has a hook-shaped portion that extends outward from the body, and each hook-shaped portion engages with the recess in the cap to provide a tamper evident feature of the cap in a closed position of the cap on the spout.

5. The body according to claim 1, wherein the body forms a lower portion having an opening with a generally circular shape that is large enough to fit and accommodate a valve component of an enteral feeding system.

6. The body according to claim 1, wherein an external spout surface comprises a pair of separate and independent external threads each having a thread end on one of two opposing sides of the spout and extending from a top end of the spout and about the external spout surface, wherein the cap threads over both of the pair of separate and independent external threads.

* * * * *